(12) United States Patent
Clever

(10) Patent No.: US 9,845,896 B2
(45) Date of Patent: Dec. 19, 2017

(54) SHEAR VALVE

(71) Applicant: Bryan William Clever, Liberty Township, OH (US)

(72) Inventor: Bryan William Clever, Liberty Township, OH (US)

(73) Assignee: OPW FUELING COMPONENTS INC., Hamilton, OH (US)

( * ) Notice: Subject to any disclaimer, the term of this patent is extended or adjusted under 35 U.S.C. 154(b) by 78 days.

(21) Appl. No.: 14/802,704

(22) Filed: Jul. 17, 2015

(65) Prior Publication Data

US 2016/0258546 A1 Sep. 8, 2016

Related U.S. Application Data

(60) Provisional application No. 62/129,590, filed on Mar. 6, 2015.

(51) Int. Cl.
*F16K 17/40* (2006.01)
*F16K 17/04* (2006.01)
*F16K 17/14* (2006.01)

(52) U.S. Cl.
CPC .......... *F16K 17/406* (2013.01); *F16K 17/048* (2013.01); *F16K 17/14* (2013.01)

(58) Field of Classification Search
CPC ....... F16K 17/406; F16K 17/14; F16K 17/048
USPC .............. 137/67, 68.11, 68.14, 71, 906
See application file for complete search history.

(56) References Cited

U.S. PATENT DOCUMENTS

| 3,435,848 | A |   | 4/1969  | Johnston |
|-----------|---|---|---------|----------|
| 4,077,422 | A | * | 3/1978  | Brinkley ................ F16K 17/30 |
|           |   |   |         | 137/68.14 |
| 4,583,711 | A |   | 5/1986  | Winters et al. |
| 4,898,199 | A |   | 2/1990  | Morris et al. |
| 4,899,786 | A |   | 2/1990  | Morris et al. |
| 4,921,000 | A |   | 5/1990  | King et al. |
| 5,099,870 | A |   | 3/1992  | Moore et al. |
| 5,222,520 | A |   | 6/1993  | Anderson et al. |
| 5,564,471 | A |   | 10/1996 | Wilder et al. |
| 6,802,332 | B1 |  | 10/2004 | Stuart |
| 8,931,499 | B2 |  | 1/2015  | Clever et al. |

FOREIGN PATENT DOCUMENTS

EP 0763689 3/1997
EP 2314541 4/2011

* cited by examiner

*Primary Examiner* — Craig Schneider
*Assistant Examiner* — P. Macade Nichols
(74) *Attorney, Agent, or Firm* — Thompson Hine LLP

(57) ABSTRACT

A valve including a valve body having an area of weakness along which the valve body is predisposed to break. The valve further includes a closure valve positioned in the valve body, wherein the valve body includes a chamber configured to retain fluid therein to thereby maintain the closure valve in an open position. The valve is configured such when at least part of the valve body is sufficiently displaced or broken along the area of weakness at least part of the fluid in the chamber escapes the chamber, thereby causing or enabling the closure valve to move to a closed position.

25 Claims, 11 Drawing Sheets

SHEAR VALVE

This application claims priority to U.S. Provisional Application Ser. No. 62/129,590, filed on Mar. 6, 2015, the entire contents of which are hereby incorporated by reference.

The present invention is directed to a shear valve for use in a fluid dispensing system.

BACKGROUND

Shear valves can be utilized in fluid dispensing systems, such as gasoline refueling stations and the like. For example, in some cases a vehicle or other component can collide with a fuel dispenser, causing the dispenser to be displaced from its fluid supply line. Shear valve assemblies are designed to provide a breakaway point at which the fluid supply system can break, shear or separate, while also provide a closing valve or valves to prevent or minimize loss of fuel. However, many shear assemblies do not perform satisfactorily, particularly when used with pressurized fluid.

SUMMARY

In one embodiment, the present invention is a shear valve assembly which has increased sensitivity and can be used with (but is not limited to use with) pressurized fluid. More particularly, in one embodiment, the invention is a valve including a valve body having an area of weakness along which the valve body is predisposed to break. The valve further includes a closure valve positioned in the valve body, wherein the valve body includes a chamber configured to retain fluid therein to thereby maintain the closure valve in an open position. The valve is configured such when at least part of the valve body is sufficiently displaced or broken along the area of weakness at least part of the fluid in the chamber escapes the chamber, thereby causing or enabling the closure valve to move to a closed position.

DETAILED DESCRIPTION

Figure 1:
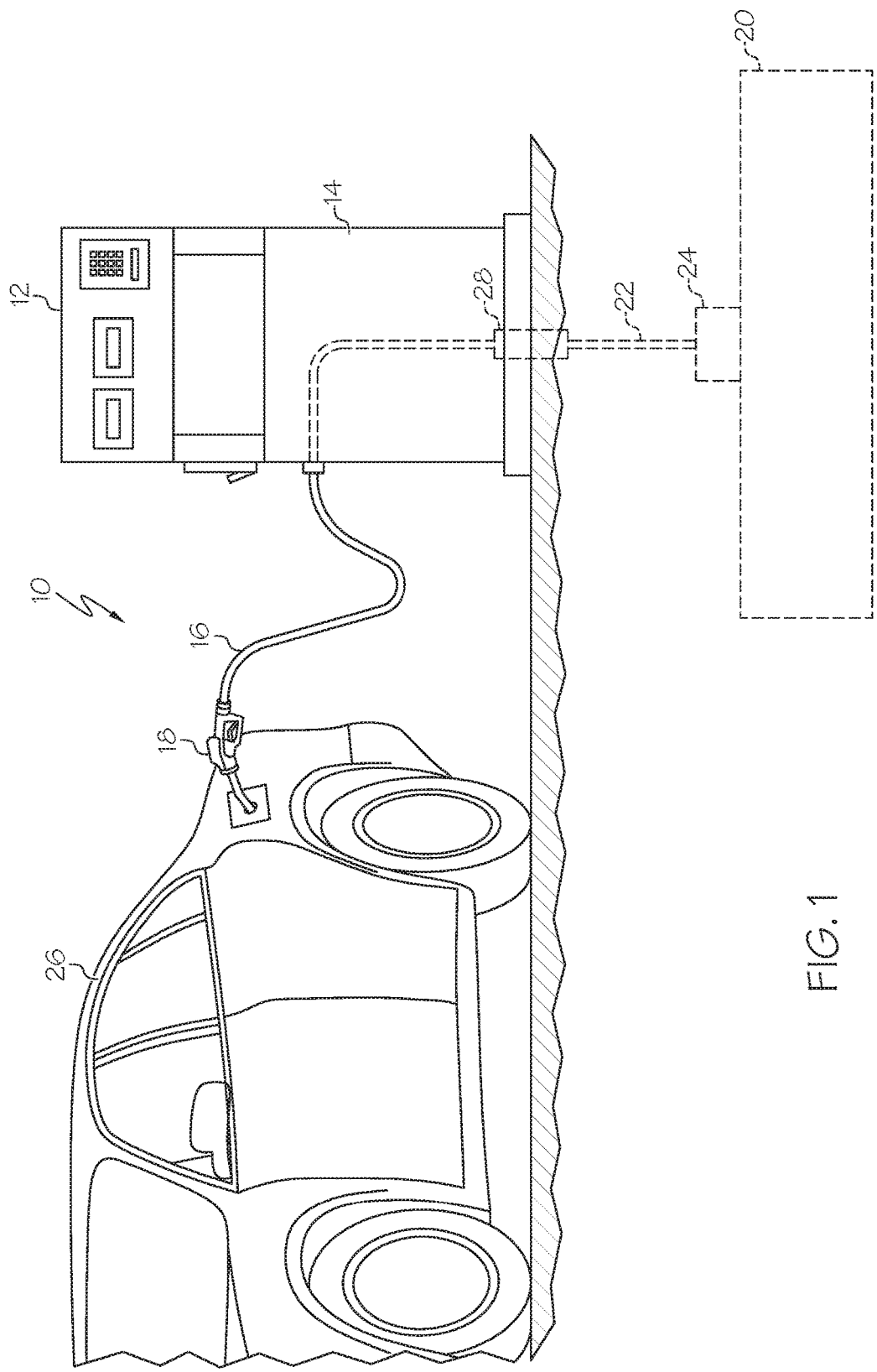
FIG. 1 is a schematic representation of a refueling system utilizing a shear valve.

FIG. 1 is a schematic representation of a refilling system 10 including a dispenser 12. The dispenser 12 includes a dispenser body 14, a hose 16 coupled to the dispenser body 14, and a nozzle 18 positioned at the distal end of the hose 16. The hose 16 may be generally flexible and pliable to allow the hose 16 and nozzle 18 to be positioned in a convenient refilling position as desired by the user/operator.

The dispenser 12 is in fluid communication with a fuel/fluid storage tank 20 via a liquid or fluid conduit or path 22 that defines a fluid path/flow path therein, and extends from the dispenser 12 to the storage tank 20. The storage tank 20 can include or be fluidly coupled to a pump 24 which is configured to draw fluid/fuel out of the storage tank 20 and supply such fluid to the dispenser 12/nozzle 18. The nozzle 18 can be inserted into a fill pipe of a vehicle 26 and operated to fill/refuel a fuel tank of the vehicle 26, or to fill some other fuel/fluid containment vessel.

The system 10 disclosed herein can be utilized to store/dispense any of a wide variety of fluids, liquids or fuels, including but not limited to petroleum-based fuels, such as gasoline, diesel, natural gas, biofuels, blended fuels, propane, oil, or ethanol the like. The system 10 can also be utilized to store/dispense compressed natural gas ("CNG"), which can take the form of methane in its gaseous state under high pressure, or a combination of gases of mostly methane, and the system 10 may also be used to dispense compressed hydrogen. In these cases the CNG or hydrogen can be stored and dispensed under pressure (in one case in the range of between about 2,900 and about 3,600 psi, or at least about 2,000 psi in one case, or in another case at least about 2,900 psi, or at least about 70 psi in one case, or less than about 3600 psi in one case, or less than about 10,000 psi in another case).

Figure 2:
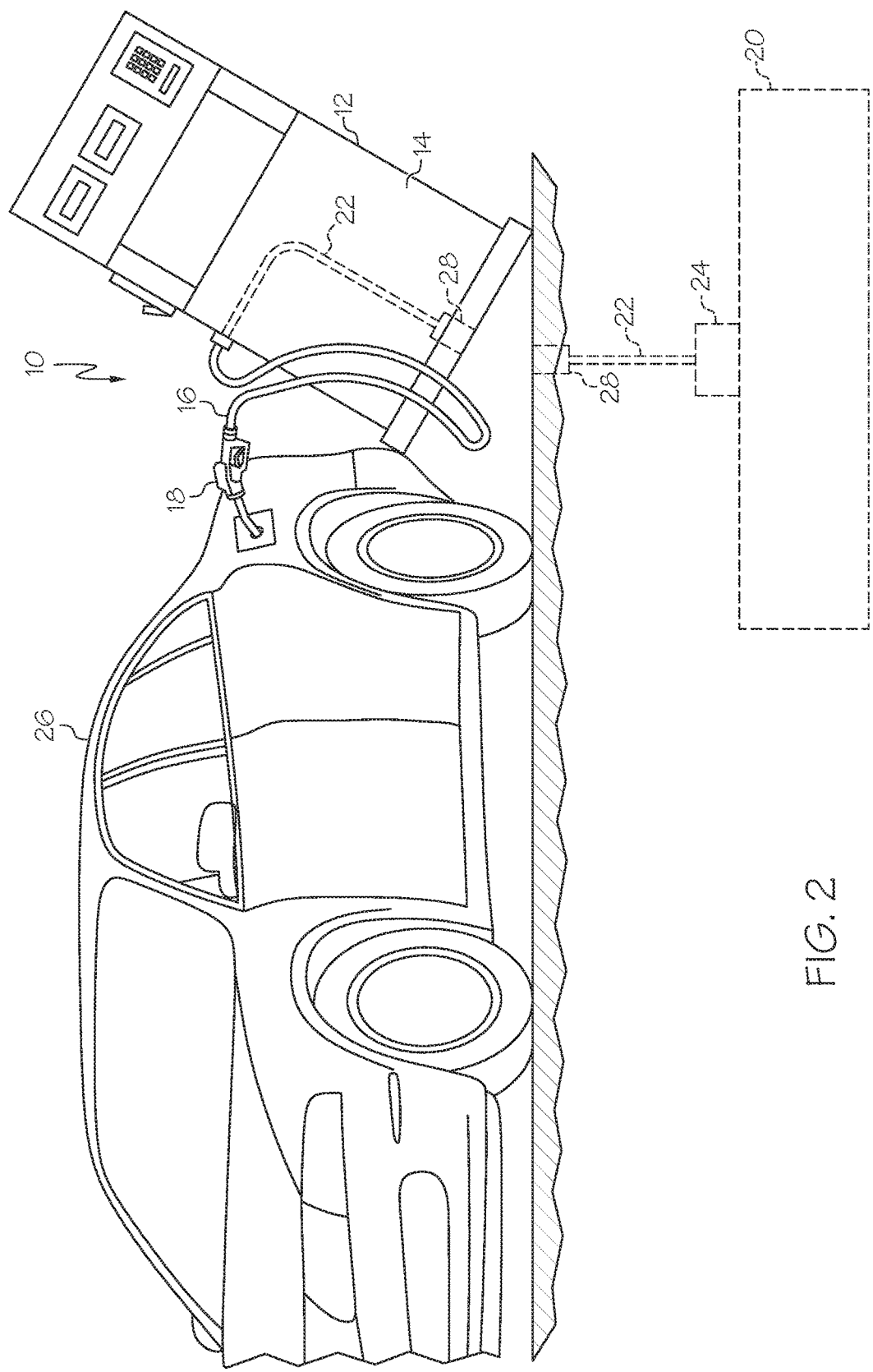
FIG. 2 shows the system of FIG. 1 with the dispenser displaced.

As shown in FIG. 2, in some cases the vehicle 26, or some other component (such as a trailer, mechanical equipment, etc.) can impact the dispenser 12 and apply forces, such as shear forces, to the fluid conduit 22. In order to accommodate such forces, the system can include a shear valve 28 positioned in the dispenser 12/fluid path or conduit 22. The shear valve 28 can provide a predetermined break point along which the fluid conduit 22 can be severed or disrupted, and can includes closure mechanisms/valves on one or both sides of the break point to close the fluid path 22 after severing/disruption to limit the loss of fluid.

FIG. 2 illustrates a catastrophic separation in which the fluid path 22/shear valve 28 is completely separated. However, in some cases the applied force may not cause such a complete separation, and instead the applied force may only cause a slight displacement of the dispenser 12/fluid path 22/shear valve 28. For example, slight impacts or other forces such as frost heave, ground shifts or earthquakes, construction or blasting forces, etc. can cause a rupture in the fluid path 22 and/or only partial displacement of the dispenser 12/fluid path 22/shear valve 28. Thus in one case the shear valve 28 is configured to trigger its closure mechanism(s)/valve(s) in the case of such partial displacement of the fluid path 22.

It is noted FIGS. 1 and 2 disclose only a single fluid path 22 with a single shear valve 28 positioned therein. However, it should be understood that the system 10/dispenser 12 may include more than one fluid paths 22, for example, providing connections of the dispenser 12 to multiple fuel tanks. In addition, the dispenser 12 could include vapor recovery lines or other vapor/fluid paths that extend externally of and/or internally to the dispenser 12. Each of these additional fluid paths can includes its own shear valve 28, if desired. Moreover, the shear valve(s) 28 disclosed herein can be used at nearly any point in the fluid path 22, and in addition the shear valves 28 are not limited to fuel dispensing systems or the like. Thus the shear valve(s) 28 disclosed herein can be used in any fluid line which is desired to accommodate applied forces, such as shear forces or the like.

Figure 3:
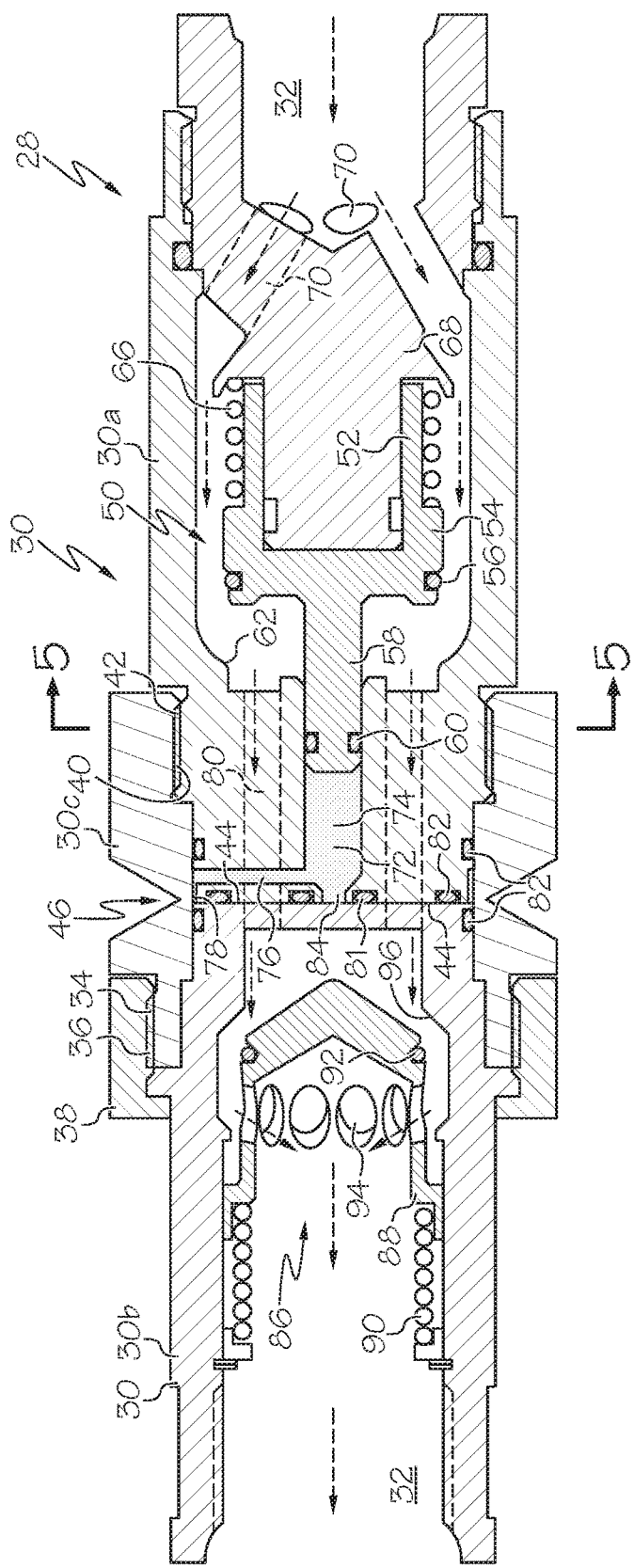
FIG. 3 is a side cross section of one embodiment of a shear valve, shown in its operating configuration.
Figure 4:
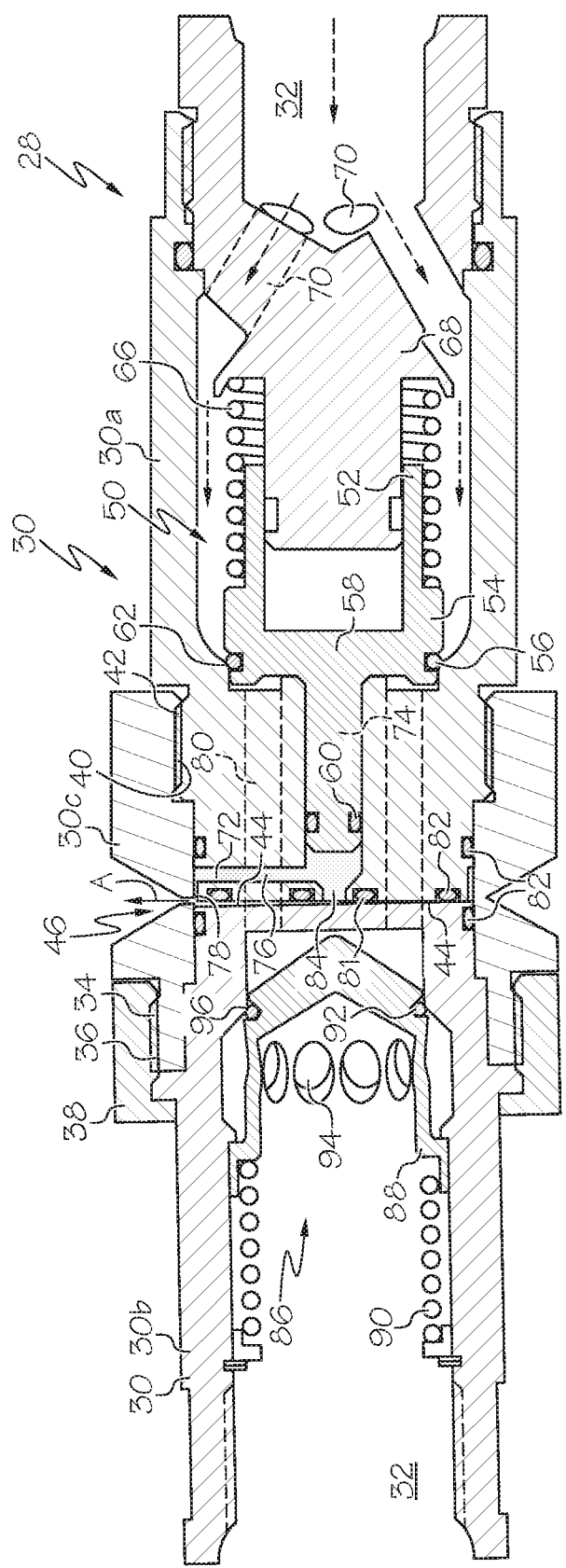
FIG. 4 is a side cross section of the shear valve of FIG. 3, shown in its non-operating configuration.
Figure 5:
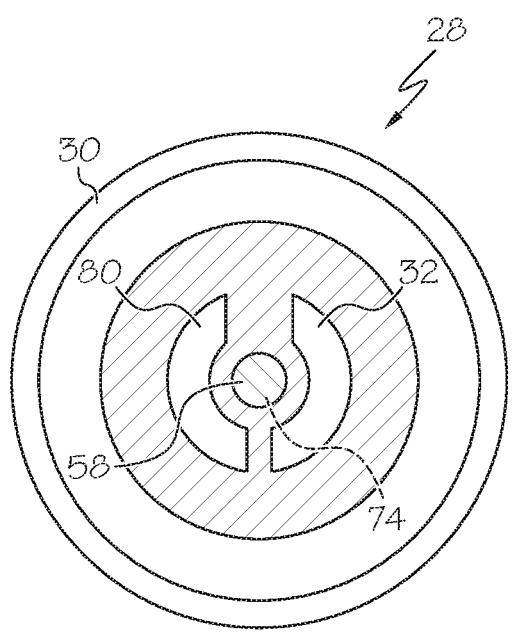
FIG. 5 is a cross section taken along line 5-5 of FIG. 3.

With reference to FIGS. 3-5, in one embodiment the shear valve 28 includes a valve body 30 having a first or upstream portion 30a, second or downstream portion 30b, and a coupling portion 30c positioned therebetween. The valve 28 is connectable to the fluid line 22, as shown in FIG. 1, such that fluid flows through a fluid path or flow path 32 of the valve 28 in a downstream direction from the first portion 30a to the second portion 30b (in a right-to-left direction in FIGS. 3 and 4). The first portion 30a and/or second portion 30b and/or third portion 30c can be separate, non-integral components not made from the same piece of material.

In the illustrated embodiment the coupling portion 30c is threadably coupled to both the upstream 30a and downstream 30b portion. More particularly the illustrated coupling portion 30c includes an externally threaded surface 34 that is configured to threadably engage an internally threaded surface 36 of a collar 38 that is coupled to or forms part of the downstream portion 30b. The coupling portion 30c can also include an internally threaded surface 40 that is configured to threadably engage an externally threaded surface 42 of the upstream portion 30a of the valve body 30. However, it should be understood that the upstream 30a, downstream 30b and coupling 30c portions can be coupled together in a variety of manners beyond the threaded arrangement shown herein. In addition, in an alternative embodiment the valve body 30 may not even necessary include a coupling portion 30c, and instead the upstream 30a and downstream portions 30b could be directly coupled together. In a further alternative embodiment the valve body 30 is made of a single body or portion without any threaded or other connections or the like.

The upstream portion 30a and downstream 30b portions can each include an end face or contact area 44 that face each other. Each end face 44 can be aligned in a radial plane. The upstream 30a and downstream 30b portions may each be threaded into the coupling portion 30c and tightened sufficiently such that the end faces 44 contact and/or sealingly engage each other.

The valve body 30 can include an area of weakness 46 along which the valve body 30 is predisposed to shear. In the illustrated embodiment the area of weakness 46 is positioned in the coupling portion 30c and axially aligned or generally axially aligned with the end faces 44, but the area of weakness 46 could instead or in addition be located at other portions of the valve body 30. The area of weakness 46 is shown as a groove or notch formed in the valve body 30, but could take any of a variety of other forms, such as other areas of reduced thickness or strength, or the use of differing materials in the area of weakness 46, or a particular shape configured to concentrate applied (shear) forces, or be configured to be more easily distorted or sheared than surrounding areas, etc.

The valve 28 can include a closure valve 50 positioned in the valve body 30, and more particularly the upstream portion 30a of the valve body 30a. The closure valve 50 includes a movable body 52 including a base portion 54 carrying an sealing surface 56 thereon in the form of an O-ring, and a relatively narrow stem portion 58 extending downstream from the base portion 54 and carrying an O-ring thereon 60. The closure valve 50 is shown in FIG. 3 in its open (upstream) position wherein the movable body 52 is spaced away from a closure valve seat 62 of the valve body. When the closure valve 50 is in the open position fluid is allowed to or enabled to flow through the valve 28/valve body 30/upstream portion 30a, as shown by the dashed-line arrows in FIG. 3.

FIG. 4 illustrates the closure valve 50 in its closed position wherein the movable body 52 has moved downstream from its open position, and sealingly engages the valve body 30/closure valve seat 62 via the O-ring 56. When the closure valve 50 is in the closed position the closure valve 50 blocks or generally blocks fluid from flowing through the valve 28/valve body 30/upstream portion 30a. The closure valve 50 is spring biased in or toward its closed position by a closure valve spring 66 positioned between the movable body 52 of the closure valve 50 and a spring anchor component 68 of the valve body 30. The valve body 30 includes a plurality of openings 70 positioned around the spring anchor component 68 to allow fluid to flow past the spring anchor component 68.

The valve body 30 includes a chamber 72 which is generally sealed and fluidly isolated from the fluid path 32 when the valve 28 is in its first, connected or operating configuration, as shown in FIG. 3. The chamber 72 includes a narrow center portion 74 which closely receives the stem portion 58 of the movable body 52 therein. In particular, the O-ring 60 on the stem portion 58 sealingly engages the wall of an upstream portion of the central portion 74 of chamber 72 in FIG. 3. In this manner the closure valve 50 can be positioned in or considered to define at least part of the chamber 72.

The chamber 72 further includes a radially extending portion 76, and an outer portion 78, which extends axially and is radially offset from a radial center of the valve body 30. As shown in FIG. 5, the center portion 74 of the chamber 72 can be formed in a center body of the valve body which includes a passageway 80 to allow fluid to be dispensed to flow through the valve body 30. The center portion 74 and outer portion 78 of the chamber 72 are both axially oriented and extend to, and are in fluid communication with, one or both of the end faces 44 of the upstream portion 30a and the downstream portion 30b of the valve body 30. The outer portion 78 of the chamber 72 can take the form of a circumferentially-extending groove formed in an end face 44 and/or a radially outer surface of one or both of the valve body portions 30a, 30b.

As outlined above, the outer portion 78 of the chamber 72 extends to, and is in fluid communication with, the end face 44 of the upstream portion 30a and the downstream portion 30b of the valve body 30, and may also be in fluid communication with an outer radial surface of the upstream portion 30a. The outer portion 78 of the chamber 72 thus can, in one case, be positioned adjacent to and/or axially aligned with the area of weakness 46. The valve 28 can include an O-ring 81 extending around the center portion 74 of the chamber 72 to seal the chamber 72 when the valve 28 is in its operating configuration. Similarly, a set of three O-rings 82 can be positioned adjacent to the outer portion 78 of the chamber 72 to seal the chamber 72.

A fluid 84 can be positioned in the chamber 72 and retained therein when the valve 28 is in its connected/operating configuration. The retained fluid 84 can take any of a variety of forms, such an incompressible fluid or liquid that is non-flammable and/or non-corrosive and/or does not freeze in the range of temperatures to which the system is expected to be exposed (e.g. have a freezing point of less than about −25 degrees Fahrenheit in one case, or less than about −40 degrees Fahrenheit in other case), and may be able to operate at up to 200 degrees Fahrenheit in some cases. When the valve 28 is in its connected/operating configuration, the closure valve 50 is retained in its open position by the retained fluid 84. In particular, the stem portion 58 engages the retained fluid 84 in the chamber 72, which prevents the closure valve 50 from moving downstream toward its closed position, as biased by the closure valve spring 66. In this manner then, in the embodiment shown in FIG. 3 the closure valve spring 66 pressurizes the retained fluid 84, while the retained fluid 84 maintains the closure valve 50 in its open position.

The downstream portion 30b of the valve body can include a non-return delivery valve or poppet valve 86 therein. The poppet valve 86 includes a movable portion 88 and poppet valve spring 90 which biases the movable portion 88 to its upstream/closed position, as shown in FIG. 4. The movable portion 88 can include a sealing surface 92, in the form of an O-ring in the illustrated embodiment. When the poppet valve 86 is open, as shown in FIG. 3 (such as when there is a pressure differential across the poppet valve 86 that is greater than the spring force), fluid can flow through openings 94 in the movable portion 88. When the poppet valve 86 is in its closed position, as shown in FIG. 4, the movable portion 88 sealingly engages a poppet valve seat 96 on the valve body 30 via the sealing surface 92, thereby blocking/closing fluid flow through the valve 28/fluid path 32/valve portion 30b. However, it should be understood that the poppet valve 86 is optional, and can be omitted in some cases if desired.

In normal operating/dispensing conditions, fluid to be dispensed flows through the fluid path 32 in the direction indicated by the dashed line arrows in FIG. 3, passing through the closure valve 50 and the poppet valve 86. The closure valve 50 is maintained in its open position by the presence of the retained fluid 84, and the poppet valve 86 is maintained in its open position by the pressure of the flowing fluid.

When a sufficient force is applied to the shear valve 28, at least part of the valve body 30 is displaced or shears along the area of weakness 46 (i.e. in the radial plane defined by the area of weakness 46, in one case). The breaking, separation or distortion of the shear valve 28 causes one or both of the valve body portions 30a, 30b (and/or their end faces 44) to move away from each other, causing a loss of seal/integrity in the chamber 72 and enabling at least part of the retained fluid 84 to escape the chamber 72 aided in some cases by the pressure exerted by the spring 66, as shown by the line A in FIG. 4 which shows escaping retained fluid 84.

When at least part of the retained fluid 84 escapes, the movable body 52 of the closure valve 50 moves in the downstream direction, urging the stem portion 58 deeper into the chamber 72 and reducing the effective size/volume of the chamber 72. When sufficient retained fluid 84 escapes, the closure valve 50 moves to its closed position, as shown in FIG. 4, as caused or enabled by loss of containment of the fluid 84. Movement of the closure valve 50 causes the O-ring 56 to engage the seat 62, blocking the flow of fluid through the valve 28, which in turn enables or causes the poppet valve 86 (if utilized) to move to its closed position as biased by spring 90, also shown in FIG. 4.

In this manner, the application of sufficient forces to the shear valve 28 causes both the closure valve 50 and the poppet valve 84 to close, thereby preventing fluid from escaping and minimizing fluid loss from the fluid conduit 22 in the event of damage to the fluid delivery system. The valve 28 thus moves to its second, non-operating or disconnected configuration, shown in FIG. 4.

In addition, in the embodiment of FIGS. 3-5 the contained fluid 84/chamber 72 has three different exposure points: 1) on an end face 44 of the valve portions 30a, 30b, at the center of the valve body 30; 2) on an end face 44 of the valve portions 30a, 30b, at a radially outer position; and 3) on a radially outer surface of the upstream valve portion 30a. These three exposure points ensure that the valve 28 is sensitive to forces that can be applied in a variety of directions and manners to the valve 28, which can cause loss of integrity of the chamber 72, and closure of the valves 50, 86, in a variety of manners. In addition, the positioning of the fluid 84/chamber 72 adjacent to the area of weakness 46 can provide increased responsiveness, as the retained fluid 84 can escape or be ejected from the chamber 72 immediately after failure at the area of weakness 46, without having to wait for any cracks or separation to propagate through the valve body 30. Finally, the pressurization of the retained fluid 84, provided by the spring 66, further improves sensitivity of the valve 28 by enabling retained fluid 84 to escape even where there is a relative small crack or movement in the valve 28.

After the valve 28 has been triggered and the valves 50, 86 are closed, the shear valve 28 may be able to be easily reassembled and reused by simply replacing the coupling portion 30c (if necessary). The upstream 30a and downstream portions 30b are then threaded into the coupling portion 30c while replacement retained fluid 84 is trapped in the chamber, and the valve 38 re-attached to the fluid line 22.

If desired, a clamp or other mechanical structure (not shown) can be coupled to an outer surface of the body 30 to couple the shear valve 28 to a base of dispenser 12, ground level framework, or other structure. In addition, components such as movable levers or devices, fluid detection means, etc. may be utilized to signal to an operator when the shut-off valve 28 has been triggered.

Figure 6:
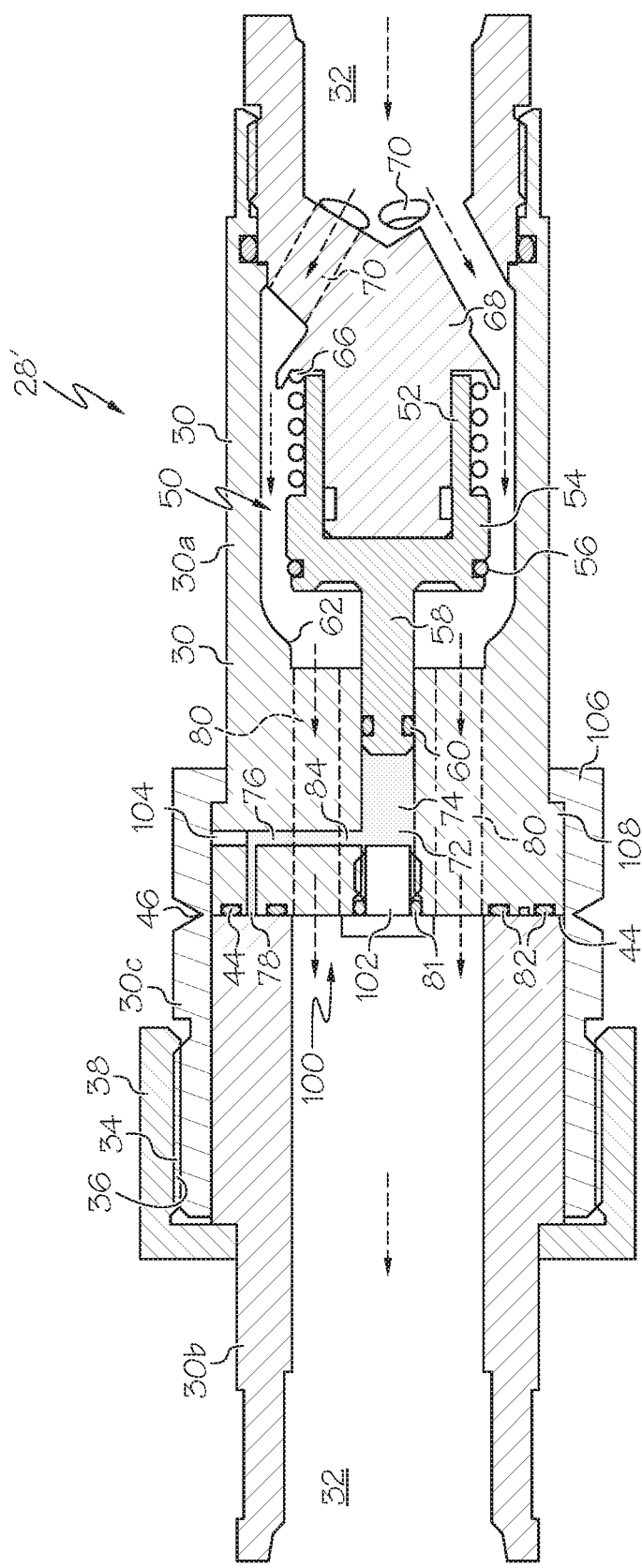
FIG. 6 is a side cross section of another embodiment of a shear valve, shown in its operating configuration.
Figure 7:
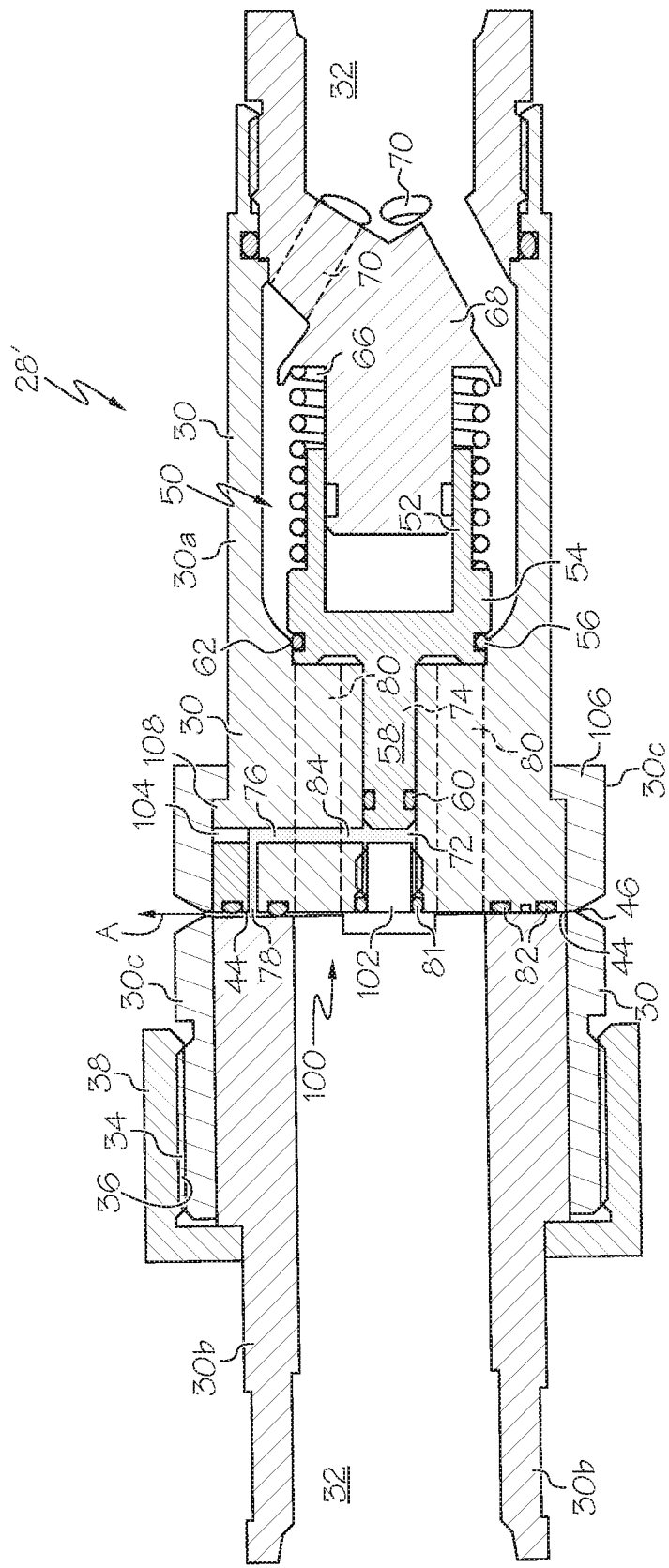
FIG. 7 is a side cross section of the shear valve of FIG. 6, shown in its non-operating configuration.

FIGS. 6 and 7 illustrate an alternative embodiment of the shear valve 28' that is similar to the embodiment of FIGS. 3-5. In the embodiment of FIGS. 6 and 7 the poppet valve 86 is omitted, although it could be included if desired. In addition, the downstream portion 30b includes a central opening 100 in its radial end face 44 which is part of the fluid path 32, which can improve fluid flow and provide ease of manufacturing. Accordingly, the downstream axial end of center portion 74 of the chamber 72 (connecting to the end face 44 of downstream portion 30b in the embodiment of FIGS. 3-5) is also omitted, in the illustrated case by inserting a plug 102 into what otherwise would be the axial end of center portion 74. In addition, the radial outer portion 78 of the chamber 72 in this embodiment does not extend out to the radially outer surface of the upstream body 30a, and is instead spaced radially inwardly from the radially outer surface. A plug 104 can be inserted into the chamber 72 to block the chamber 72 from reaching the radially outer surface of the upstream body 30a. The plugs 102, 104 could be omitted if desired and the chamber 72 instead directly formed in the desired shape, but the use of plugs can provide ease of machining/manufacturing in some cases.

The coupling portion 30c in the embodiment of FIGS. 6 and 7 differs from the coupling portion 30c of FIGS. 3-5. In the embodiment of FIGS. 6 and 7 the coupling portion 30c includes at its upstream edge, a radially-inwardly extending finger 106 that fits about a radially-outwardly extending ridge 108 of the upstream portion 30a. The coupling portion 30c can include an externally threaded surface 34 that is configured to engage an internally threaded surface 36 of the collar 38 that is coupled to or forms part of the downstream portion 30b, as in the embodiment of FIG. 3-5.

In operation the valve 28' of FIGS. 6 and 7 operates in much the same manner as the valve of FIGS. 3-5. During normal use the closure valve 50 is retained in its open position as the stem 58 portion is pressed against the retained fluid 84 by the spring. In the case of a shearing event, fluid 84 escapes the chamber 72, as shown by the line A in FIG. 7, enabling the closure valve 50 to move to its closed position, also shown in FIG. 7, blocking the flow of fluid through the valve 28'. The valve of FIGS. 6 and 7 can be reset and reused in generally the same manner as the valve of FIGS. 3-5.

Figure 8:
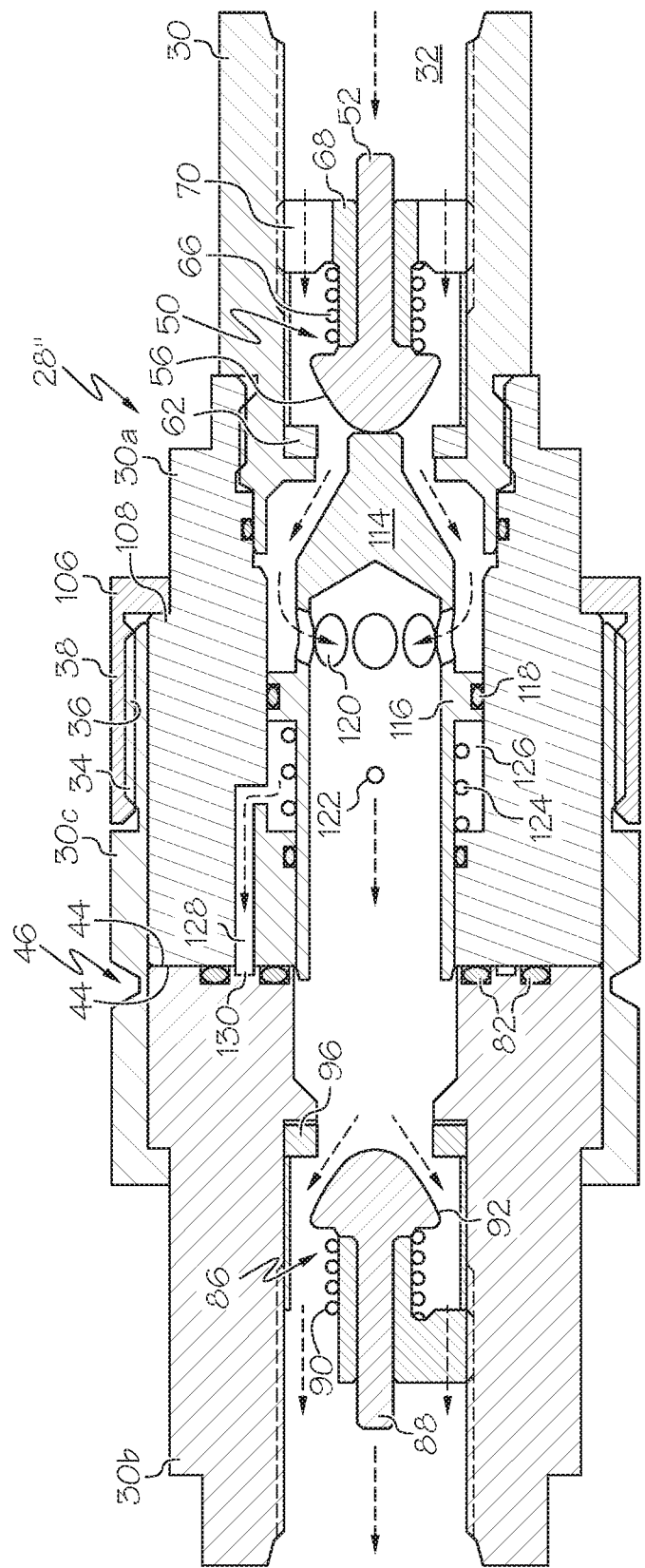
FIG. 8 is a side cross section of another embodiment of a shear valve, shown in its operating configuration.
Figure 9:
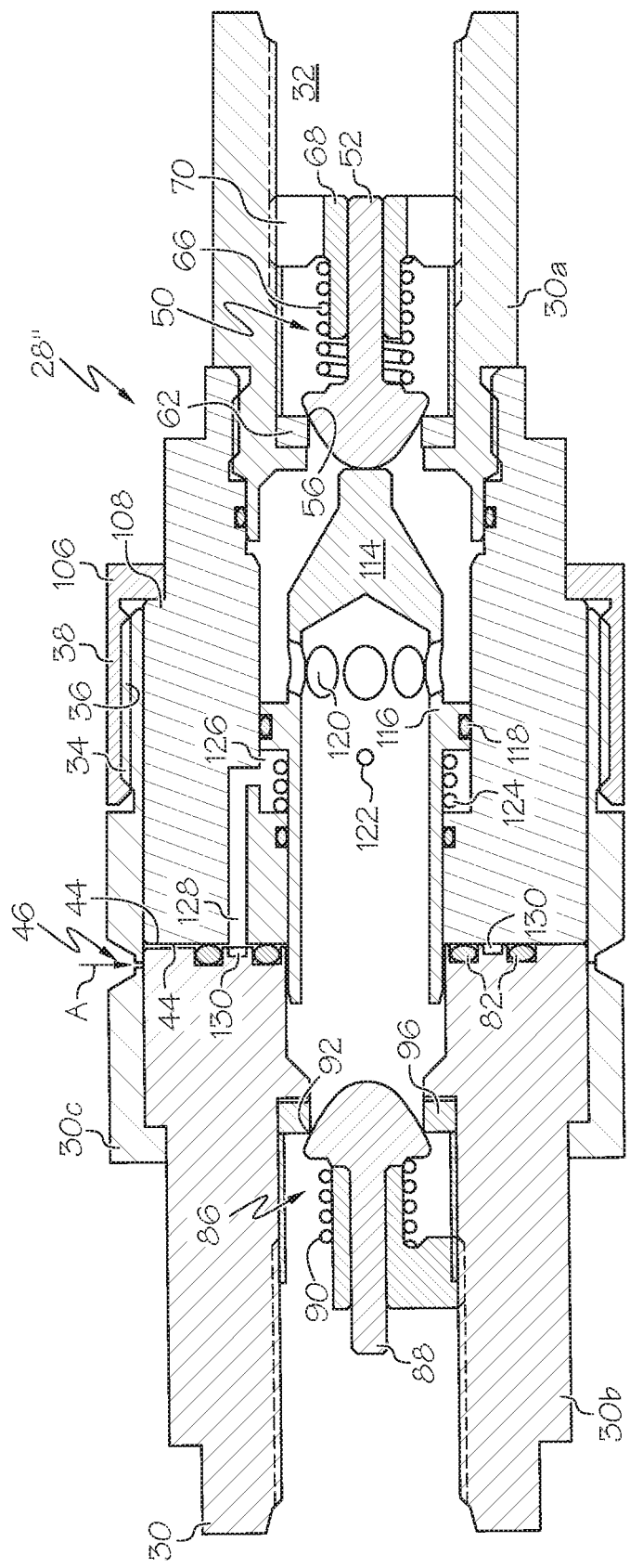
FIG. 9 is a side cross section of the shear valve of FIG. 8, shown in its non-operating configuration.

FIGS. 8 and 9 illustrate yet another embodiment of the shear valve 28". In this case the shear valve 28" includes a closure valve 50 including a movable body 52 configured to engage a sealing surface 62 coupled or forming part of to the valve body 30. The closure valve 50 is shown in FIG. 8 in its open position, and is biased to its closed position by a closure valve spring 66 positioned between the movable body 52 and the spring anchor component 68.

The shear valve 28" includes a poppet or shuttle 114 positioned in the fluid path 32, the poppet 114 including a collar 116 which extends radially outwardly and forms a seal with the valve body 30 via an O-ring 118 or the like carried on the collar 116. The poppet 114 includes a set of openings 120 circumferentially spaced thereabout and positioned upstream of the collar 116 to allow fluid to flow therethrough. The poppet 114 further includes a supplemental opening 122 positioned downstream of the collar 116. The poppet 114 is axially movable relative to the valve body 30 and is biased to its upstream position by a poppet spring 124 positioned in the fluid path 32.

The poppet 114 and valve body 30 can together form a closed (or generally closed) chamber 126 positioned downstream of the collar 116 that is fluidly isolated (or generally fluidly isolated) from the fluid path 32. The chamber 126 can have an outer or downstream portion 128 which is in fluid communication with the end faces 44 of the upstream 30*a* and downstream portions 30*b*. In the illustrated embodiment the downstream portion 30*b* includes a circumferential groove 130 that is in fluid communication with, or defines part of, the chamber 126/128. However, if desired the circumferential groove 130 can be omitted. The circumferential groove 130 can also be used in the embodiments of FIGS. 3-5 and FIGS. 6 and 7 if desired. A pair of O-rings 82 can be utilized to seal the outer/downstream portion 128 of the chamber 126. The opening 122 of the poppet 114 is in fluid communication with the chamber 126, and thereby provides a restricted path of fluid communication between the chamber 126 and the fluid path 32.

The upstream 30*a* and downstream 30*b* portions are held tight via a coupling portion 30*c* analogous to that in the embodiment shown in FIGS. 6 and 7, and the coupling portion 30*c* includes the area of weakness 46. The downstream portion 30*b* can include a non-return/poppet valve 86 positioned therein.

The closure valve 50 can be held in its normal open position, as shown in FIG. 8, by an upstream end of the poppet 114 which engages, and moves upstream, the movable body 52 of the closure valve 50 when the poppet 114 is in its extended (upstream) position. The poppet valve spring 124 can be stronger than the closure valve spring 66 such that in normal operating conditions, such as when fluid is flowing through the closure valve 50, the closure valve 50 is maintained in its open position.

In normal conditions, fluid flows through the shear valve 28''' in the direction indicated by the dashed line arrows in FIG. 8 into the upstream portion of the valve 28''', passing through the open closure valve 50. The fluid then enters into the poppet 114 through the holes 120 and flows across the hole 122. The flow of fluid across the hole 122 causes the chamber 126 to experience a negative/vacuum force therein due to the venturi effect of fluid flowing across the hole 122, but the negative pressure is low or negligible since the closed chamber 126 is generally sealed, particularly at its downstream end. This negative/venturi pressure, if any, is applied to the end faces 44 of the upstream 30*a* and downstream 30*b* portions. Under the pressure from flowing fluid, the poppet valve 86 opens against spring 90 and allows fuel to pass through the downstream portion 30*b*.

When the valve body 30 is distorted or fractured along the area of weakness 46 (or a radial plane along the area of weakness 46) the chamber 126 is breached and is exposed to atmosphere, particularly at the end faces 44 of the upstream 30*a* and downstream 30*b* portions. The loss of seal in the chamber 126 causes a pressure drop in the chamber 126, thereby pulling surrounding atmospheric air into the chamber 126 (shown by air flow along arrow A of FIG. 9) and a new or increased venturi flow through the hole 122. The reduced pressure in the chamber 126 acts upon the poppet 114. This reduced pressure force, along with fluid pressure acting upon poppet 114 and the force of the spring 66, together overcome the force of the poppet spring 124, and the poppet 114 is moved downstream to its retracted position (to the left in the illustrated embodiment). Retraction of the poppet 114 enables the closure valve 50 to close on the valve seat 62, as biased by spring 66. The blocking of fluid flow in this manner reduces or eliminates the pressure opening the poppet valve 86, causing or enabling the poppet valve 86 to close.

Once fluid stops flowing through the poppet 114, venturi force in the chamber 128 may also be reduced, which can cause the poppet spring 124 to try to move the poppet 114 back upstream. However, when the closure valve 50 is moved to its closed position, fluid upstream of the closure valve 50 backs up and provides a high static pressure, overcoming the force of the poppet spring 124 and retaining the poppet 114 and closure valve 50 in their downstream position.

In order to reset the valve 28" of this embodiment, the coupling portion 30*c* may need to be replaced. Pressure upstream of the closure valve 50 may then need to be relieved by, for example, either disconnecting or venting the upstream pressure, such as by activating an upstream isolation maintenance valve. Once the pressure is relieved the poppet 114, biased by poppet spring 124 moves forward and the system can be reset.

Figure 10:
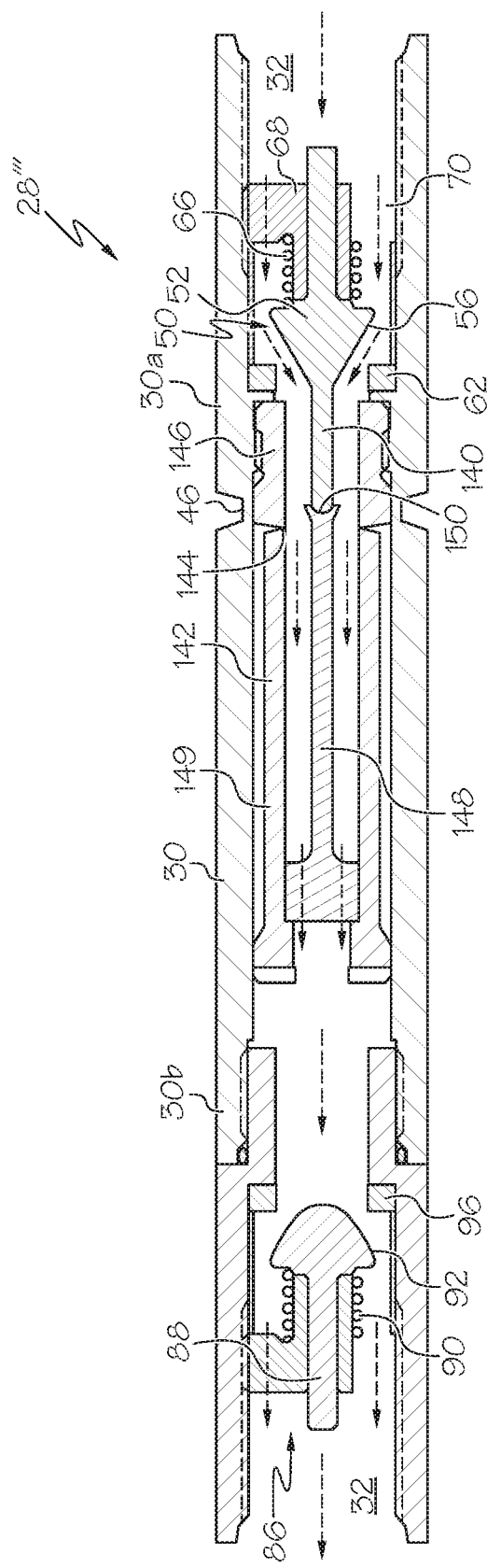
FIG. 10 is a side cross section of another embodiment of a shear valve, shown in its operating configuration.
Figure 11:
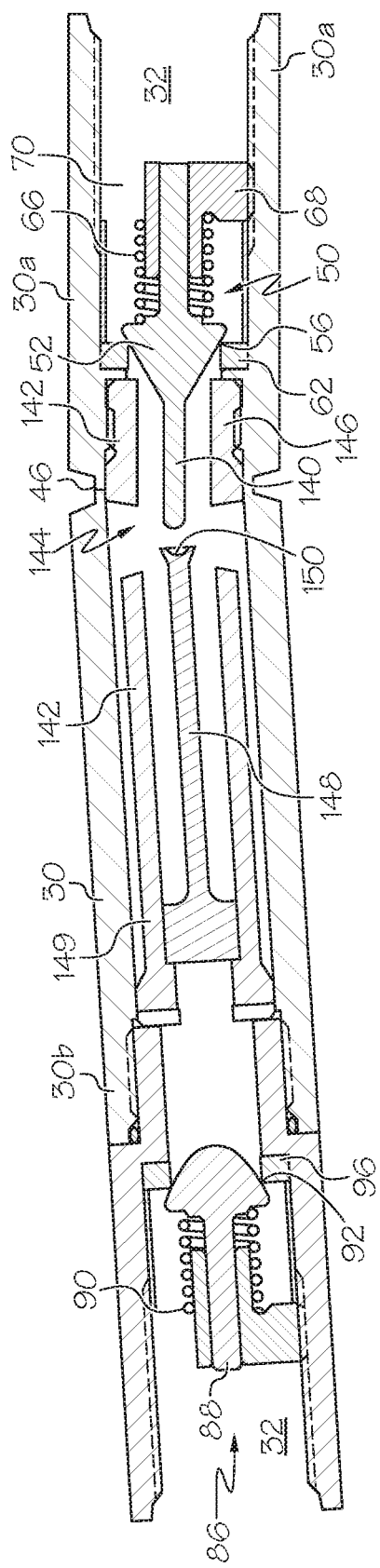
FIG. 11 is a side cross section of the shear valve of FIG. 10, shown in its non-operating configuration.

FIGS. 10 and 11 illustrate another embodiment of the shear valve 28'''. In this embodiment the upstream portion 30*a* of the body 30 and the downstream portion 30*b* can be directly coupled together and no coupling portion 30*c* is utilized. In fact in the illustrated embodiment the upstream 30*a* and downstream 30*b* portions are formed as areas or portions of as a single, unitary piece of material 30, with the area of weakness therebetween and defining/delineating the upstream 30*a* and downstream 30*b* portions. The shear valve 28''' includes a closure valve 50 in the upstream portion 30*a* that is spring biased toward its closed position by a closure valve spring 66 positioned between the movable body 52 of the closure valve 50 and a spring anchor component 68 of the valve body 30.

The movable body 52 of the closure valve 50 includes a stem portion or extension portion 140 extending in the downstream direction which can have a shape somewhat analogous to the stem portion 58 of the shear valve 28 of FIGS. 3-5, but has a different function. In this embodiment the extension portion 140 may terminate at or adjacent to an axial position of the area of weakness 46 of the valve body.

The shear valve 28''' includes a hold-open device 142 positioned in both the upstream portion 30a and the downstream portion 30b in the illustrated embodiment. The hold-open device 142 can be a generally cylindrical frangible/brittle body, and has its own area of weakness or breakage point 144 which provides an easily frangible breakage location. The area of weakness 144 can be formed by a notch as shown, or by any of the other methods or structures described above for the area of weakness 46 formed in the body 30. In one case the area of weakness 144 of the hold-open device 142 is weaker/more delicate/more brittle/more easily broken than the area of weakness 46 in the body 30. The areas of weakness 46, 144 can be located at approximately the same axial location. An upstream end 146 of the hold-open device 142, positioned upstream of the area of weakness 144, is secured to the upstream portion 30a of the body, such as by a threaded connection in one case.

The hold-open device 142 is configured to engage a distal end of the extension portion 140 of the closure valve 50 to retain the closure valve 50 in its open position during normal operating conditions, such that the spring 66 applies a force in the downstream direction upon the hold-open device 142. The hold-open device 142 can include a hollow, cylindrical outer portion 149 and a central shaft 148. The central shaft 148 can have a socket 150 at an end thereof in one case, to receive/engage the extension portion 140 of the closure valve 50, at a position generally axially aligned with the areas of weakness 46, 144.

In normal operating conditions, fluid flows in the right-to-left direction through the valve 28''', flowing through the open closure valve 50, the hold-open device 142 and the poppet 86. In the event of a collision or other event causing damage or applying sufficient force to the valve 28''', the hold-open device 142 is distorted or fractured along the radial plane of its area of weakness 144. As outlined above, the valve body 30 may be more ductile/flexible than the hold-open device, and/or be stronger at its area of weakness 46, such that for most expected applied forces, the hold-open device 142 fractures or separates along its area of weakness 144 while the valve body 30 does not fracture or separate along its area of weakness 46, as shown in FIG. 11. The ductile nature of the body 30 at the area of weakness 46 also enables the body to transmit shear forces to the hold-open device 142 contained therein.

When the hold-open device 142 is fractured along its area of weakness 144, portions of the hold-open device 142 downstream of the area of weakness 144 move downstream/to the left, as biased by the spring 66 and pressure of the flowing fluid. This downstream movement of the hold-open device 142 enables the closure valve 50 to move to its closed position, closing on the valve seat 62 as shown in FIG. 11, thereby preventing any loss of fuel. The blocking of fluid flow reduces the pressure opening the poppet valve 86, so that the poppet valve 86 also closes onto its seat 96.

As outlined above, FIG. 11 illustrates the case where the hold-open device 142 is fractured while the body 30 remains intact or generally intact. In this case the valve body 30 can help to retain any leaked fluid therein. If the body 30 is not fractured the body 30 may be able to be re-used by threading or otherwise securing a new hold-open device 142 in place. However, stronger shear forces can also cause the body 30 to be broken or displaced along the area of weakness 46. In this case, the more brittle hold-open device 142 will also be broken or displaced, and the valve(s) 50, 86 close as desired.

In this manner it can be seen that the various shear valves described and shown herein provides various benefits. The valves are easy to install and provide reliable shut-off features when sufficient forces are applied. The valves can also provide heightened sensitivity to ensure proper shut-off operations are provided, reducing loss of fluid and accompanying adverse environmental effects.

Having described the invention in detail and by reference to certain embodiments, it will be apparent that modifications and variations thereof are possible without departing from the scope of the invention.

What is claimed is:

1. A valve comprising:
    a valve body including an area of weakness along which said valve body is predisposed to break, the valve body further including a first portion and a second portion configured to move relative to each other when said valve body is displaced or broken along said area of weakness, wherein the valve body further includes a coupling portion coupling said first and second portions; and
    a closure valve positioned in said valve body, wherein said valve body includes a chamber configured to retain fluid therein to thereby maintain said closure valve in an open position, wherein said valve is configured such when at least part of said valve body is sufficiently displaced or broken along said area of weakness at least part of said fluid in said chamber escapes said chamber, thereby causing or enabling said closure valve to move to a closed position.

2. The valve of claim 1 wherein said first portion includes a contact area that is in contact with or faces a contact area of said second portion, and wherein said chamber is in fluid communication with at least one of said contact areas.

3. The valve of claim 2 wherein each contact area is an end face of the associated first or second portion and is generally aligned with a radial plane.

4. The valve of claim 2 wherein said chamber is in fluid communication with said at least one contact area in a radial center of said valve.

5. The valve of claim 2 wherein said chamber is in fluid communication with said at least one contact area at a position spaced away from a radial center of said valve.

6. The valve of claim 2 wherein said at least one contact area includes a groove formed therein and extending circumferentially thereabout, said groove being in fluid communication with said chamber.

7. The valve of claim 1 wherein said valve is configured such that fluid is flowable therethrough in a downstream direction, and wherein said first portion is positioned upstream relative to said second portion, wherein said closure valve is positioned in said first portion, and wherein the second portion includes a poppet valve positioned therein and configured to open when fluid of a sufficient pressure flows through said second portion in said downstream direction, and to close when fluid of a sufficient pressure does not flow through said second portion in said downstream direction.

8. The valve of claim 1 wherein said first portion and said second portion are separate, non-integral components not made from the same piece of material.

9. The valve of claim 1 wherein said coupling portion includes a notch or groove therein defining said area of weakness.

10. The valve of claim 1 wherein at least part of said closure valve is positioned in or defines at least part of said chamber.

11. The valve of claim 1 wherein said closure valve is configured such that movement of said closure valve from said open position to said closed position reduces a volume of said chamber.

12. The valve of claim 1 wherein said closure valve is configured to be biased to the closed position by a force which is also configured to add pressure to fluid in said chamber.

13. The valve of claim 1 wherein said valve body is predisposed to break along a radial plane defined by said area of weakness.

14. The valve of claim 1 further comprising fluid positioned in said chamber, wherein said fluid positioned in said chamber is a generally incompressible fluid.

15. The valve of claim 1 wherein said valve body includes a fluid path through which fluid which is desired to be dispensed is flowable, and wherein said chamber is fluidly isolated from said fluid path.

16. The valve of claim 1 wherein when said closure valve is in said closed position, said closure valve generally blocks fluid to be dispensed from flowing through said valve body, and wherein when said closure valve is in said open position said closure valve does not generally block fluid to be dispensed from flowing through said valve body.

17. The valve of claim 1 wherein said valve is fluidly coupled to a fuel dispensing line for dispensing fuel into an automobile fuel tank, which is in turn fluidly coupled to a fuel storage tank.

18. A valve comprising:
a valve body including an area of weakness along which said valve body is predisposed to break, the valve body further including a first portion and a second portion, and wherein said valve body further includes an another portion including said area of weakness, wherein said another portion is a separate component not made from a same piece of material as said first portion or said second portion; and
a closure valve positioned in said valve body, wherein said valve body includes a chamber configured to retain fluid therein, wherein at least part of said closure valve is positioned in or defines at least part of chamber, and wherein said valve is configured such when at least part of said valve body is sufficiently displaced or broken along said area of weakness at least part of said fluid in said chamber escapes said chamber, thereby causing or enabling said closure valve to move to a closed position.

19. The valve of claim 18 wherein said another portion is a coupling portion coupling together said first and second portions.

20. The valve of claim 18 wherein said another portion includes a notch or groove therein defining said area of weakness.

21. The valve of claim 18 wherein said another portion is made of one or multiple pieces.

22. A method for dispensing fluid comprising:
accessing a valve including a valve body having an area of weakness along which said valve body is predisposed to break, the valve body further including a first portion and a second portion which are configured to move relative to each other when said valve body is displaced or broken along said area of weakness, and wherein said valve body further includes a coupling portion coupling said first and second portions, the valve further including a closure valve positioned in said valve body, wherein said valve body includes a chamber configured to retain fluid therein, and wherein said valve includes a fluid retained in said chamber to thereby maintain said closure valve in an open position; and
coupling said valve to a fluid flow line such that fluid to be dispensed is flowable therethrough, wherein said valve is configured such when at least part of said valve body is sufficiently displaced or broken along said area of weakness at least part of said fluid retained in said chamber escapes said chamber, thereby causing or enabling said closure valve to move to a closed position.

23. A valve comprising:
a valve body including an area of weakness along which said valve body is predisposed to break, the valve body further including a first portion and a second portion which are configured to move relative to each other when said valve body is displaced or broken along said area of weakness, wherein said first portion includes a contact area that is in contact with or faces a contact area of said second portion, wherein said chamber is in fluid communication with at least one of said contact areas, and wherein said area of weakness is generally axially aligned with at least one of said contact areas; and
a closure valve positioned in said valve body, wherein said valve body includes a chamber configured to retain fluid therein to thereby maintain said closure valve in an open position, wherein said valve is configured such when at least part of said valve body is sufficiently displaced or broken along said area of weakness at least part of said fluid in said chamber escapes said chamber, thereby causing or enabling said closure valve to move to a closed position.

24. The valve of claim 23 further comprising a coupling portion coupling together said first and second portions, and wherein said coupling portion includes or defines said area of weakness.

25. The valve of claim 24 wherein said area of weakness is generally axially aligned with both of said contact areas.

* * * * *